United States Patent
Zuo et al.

(10) Patent No.: US 7,824,793 B2
(45) Date of Patent: Nov. 2, 2010

(54) BATTERY COVER ASSEMBLY FOR PORTABLE ELECTRONIC DEVICE

(75) Inventors: Zhou-Quan Zuo, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 738 days.

(21) Appl. No.: 11/402,776

(22) Filed: Apr. 12, 2006

(65) Prior Publication Data

US 2006/0279252 A1    Dec. 14, 2006

(30) Foreign Application Priority Data

Jun. 10, 2005    (CN) .................... 2005 1 0035295

(51) Int. Cl.
*H01M 2/10* (2006.01)
(52) U.S. Cl. ................. 429/97; 429/96; 429/98; 429/99; 429/100; 320/107; 320/112
(58) Field of Classification Search .............. None
See application file for complete search history.

(56) References Cited

U.S. PATENT DOCUMENTS 5,153,817 A * 10/1992 Hosoi et al. .................. 429/99
6,490,436 B1 * 12/2002 Kaiwa et al. ................ 320/107
6,515,450 B1 * 2/2003 Kaiho et al. ................ 320/112

FOREIGN PATENT DOCUMENTS

CN    03102952.3    8/2004

* cited by examiner

*Primary Examiner*—Dah-Wei D Yuan
*Assistant Examiner*—Edu E Enin-Okut
(74) *Attorney, Agent, or Firm*—Jeffrey T. Knapp

(57) ABSTRACT

A portable electronic device (101) includes a battery cover (200), a latch (200) and a housing (300). The battery cover has a resisting portion (114). One end of the latch has a limiting portion (207), another end of the latch having an engaging portion (208). The housing has a positioning portion. The latch moveably engages with the housing, and the resisting portion of the cover locks with the engaging portion for releasably locking the battery cover. The limiting portion engages with the positioning portion so as to limit the cover to open relative to the housing. This release provides a user with convenient and easy to use disassembly mechanism for the device.

11 Claims, 7 Drawing Sheets

BATTERY COVER ASSEMBLY FOR PORTABLE ELECTRONIC DEVICE

BACKGROUND OF THE INVENTION

1. Field of the Invention

The present invention generally relates to battery cover assemblies and, particularly, to a battery cover assembly for use in a portable electronic device.

2. Discussion of the Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, for example, the batteries are damaged and/or dead (i.e. no longer rechargeable).

In a typical battery cover assembly, a removable battery cover includes an upper wall, a left sidewall, a right sidewall and a top wall. The battery cover has a pair of tabs extending from one end thereof opposite to the upper wall. The tabs are for engaging in two grooves of a housing. In assembly, the tabs are firstly inserted into the grooves of the housing. Then, the cover is pressed toward the housing so as to make the upper wall, the left sidewall and the right wall abut on the peripheral wall of the housing. Accordingly the cover is mounted on the housing. Although the battery cover assembly is simple, the engagement between the battery cover and the housing of the mobile phone is too firm to be easily detached from each other.

Another typical battery cover assembly is disclosed in Chinese Patent Application Number 03102952.3. The battery cover assembly includes a cover, a housing, a button and a spring. The housing has a groove defined therein. The bottom of the button is connected with the spring. The button and the spring are together received in the groove of the housing, and the button may move relative to the housing under the role of the elastic force of the spring. A pair of clasps is disposed at two sides of the button. The cover has two spaced cutouts defined therein, which receives the clasps of the button. In assembly, the button is pressed downward. At the same time, the cover is disposed on the housing. Then, the button is released, and the button moves upward under the force of the spring. Accordingly, each of the clasps is engaged in a given cutout of the cover. The battery cover is thus assembled to the housing of the mobile phone. However, the battery cover is complicate in structure. During disassembly, the button is susceptible to damage. Furthermore, the spring will deteriorate over time due to metal-fatigue thus effecting the longevity of the battery cover assembly.

Therefore, a new battery cover assembly is desired in order to overcome the above-described shortcomings.

SUMMARY

In one embodiment thereof, a portable electronic device includes a battery cover, a latch and a housing. The battery cover has a resisting portion. One end of the latch has a limiting portion, another end of the latch has an engaging portion. The housing has a positioning portion. The latch moveably engages with the housing, and the resisting portion of the cover locks with the engaging portion thus facilitating the releasable locking of the battery cover. The limiting portion engages with the positioning portion so as to limit the cover to open relative to the housing.

Other advantages and novel features will become more apparent from the following detailed description when taken in conjunction with the accompanying drawings.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views.

DETAILED DESCRIPTION OF THE EMBODIMENTS

Figure 1:
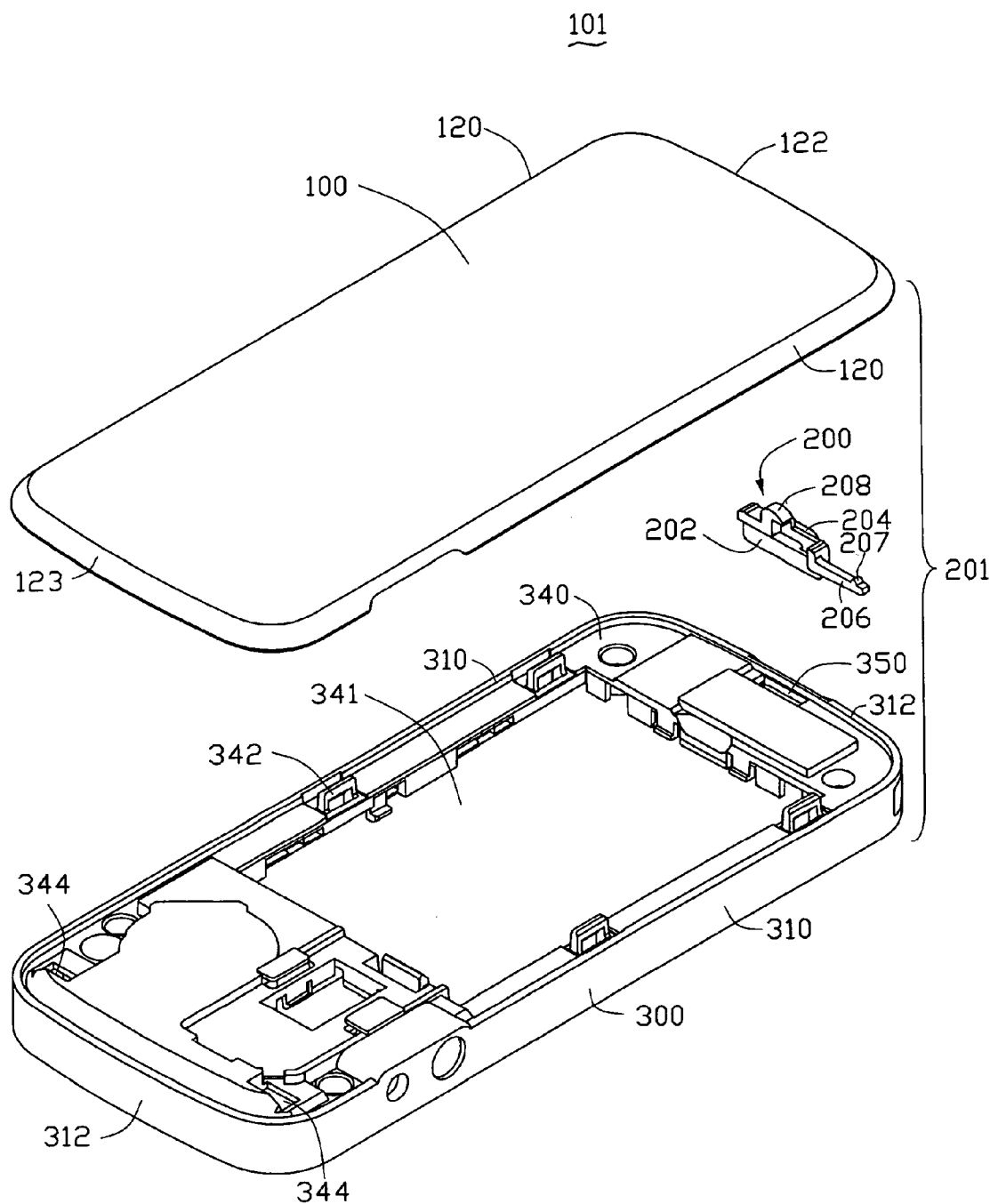
FIG. 1 is an exploded, isometric view of a portable electronic device employing a battery cover assembly in accordance with a preferred embodiment.
Figure 2:
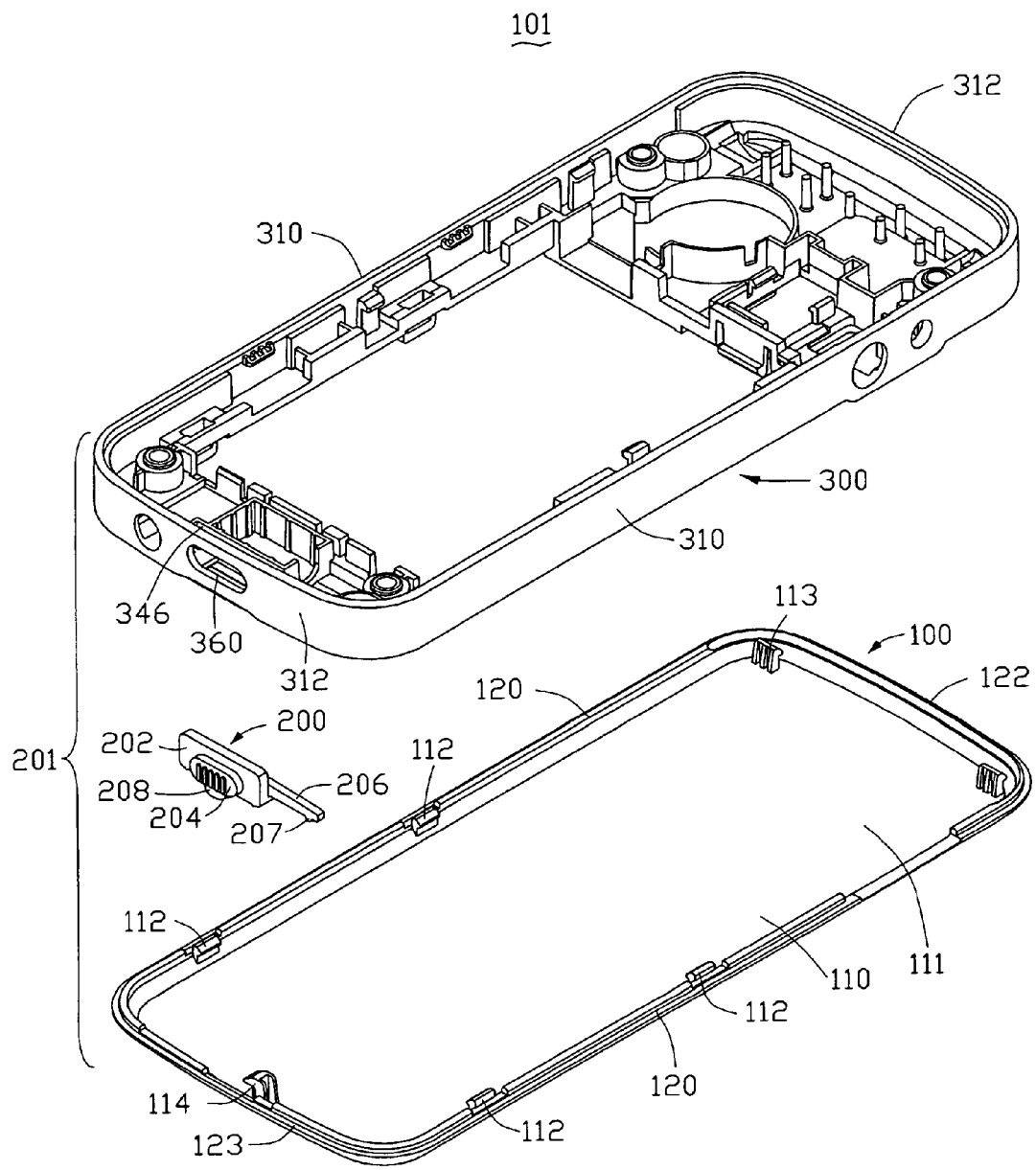
FIG. 2 is similar to FIG. 1, but viewed from another aspect.

Referring now to the drawings in detail, FIG. 1 and FIG. 2 show a portable electronic device 101 such as a mobile phone employing a battery cover assembly 201. The mobile phone 101 is taken here as an exemplary application, for the purposes of describing details of a battery cover assembly of a preferred embodiment. The battery cover assembly 201 incorporates a removable battery cover 100, a latch 200, and a housing 300. The latch 200 is configured for releasably latching (i.e. attaching, locking, engaging) the removable battery cover 100 to the housing 300.

Figure 3:
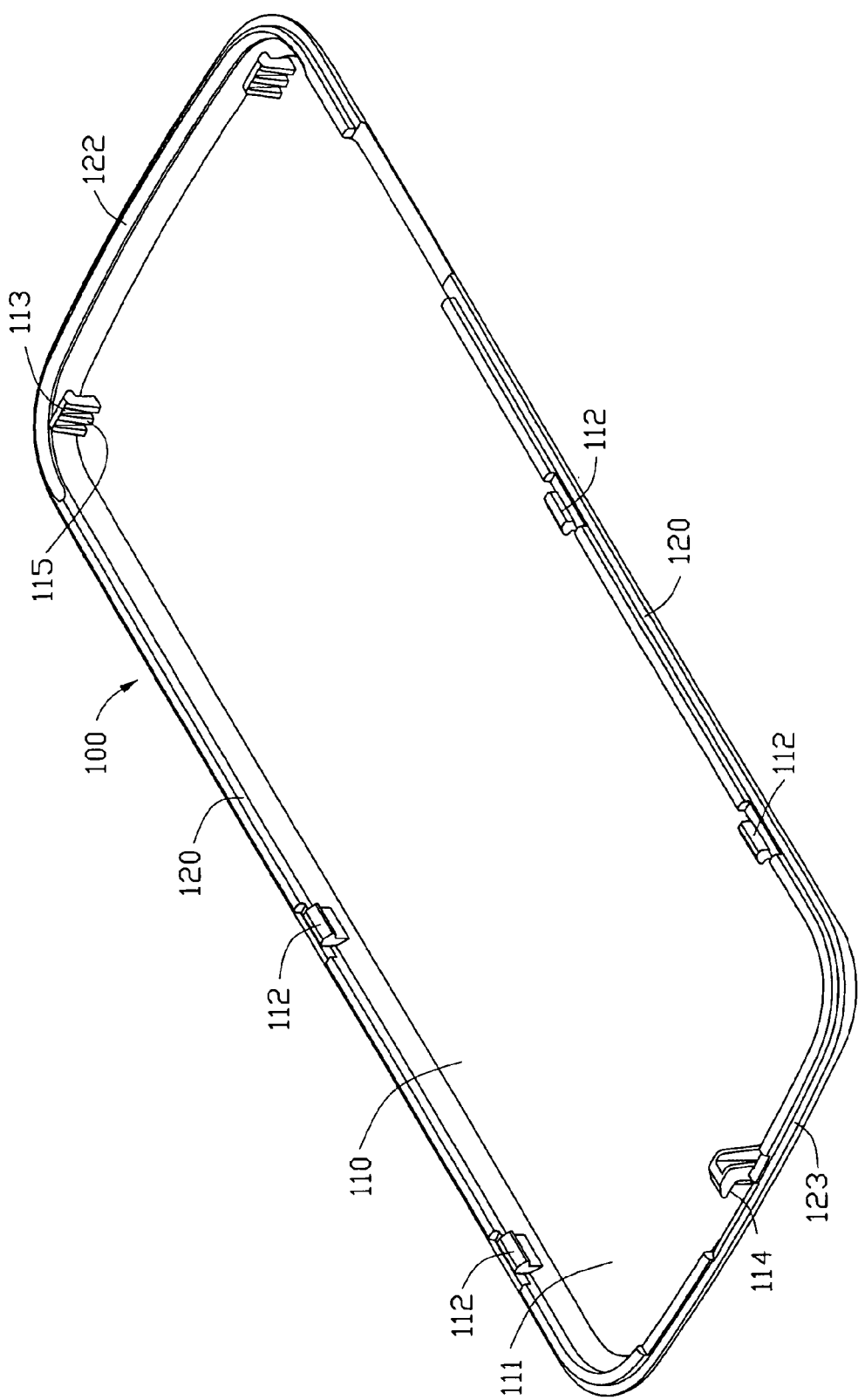
FIG. 3 is an enlarged view of the cover shown in FIG. 2.

Referring also to FIG. 3, the cover 100 includes a main body 110, two opposite sidewalls 120 and two opposite end walls 122, 123. The main body 110 has an inner surface 111, which together with the end walls 122, 123, and the sidewalls 120, defines a substantially rectangular space (not labeled). Two spaced clasps 112 are respectively formed on each of the sidewalls 120. Two spaced hooks 113 perpendicularly extend from a fringe of the inner surface 111, and are adjacent to the end wall 122. In order to strengthen the connection between the hooks 113 and the main body 110, a number of ribs 115 are formed on one side of each of the hooks 113. A resisting portion 114 is formed on the main body 110 and adjacent to the end wall 123. A distal end of the resisting portion 114 bends toward one of the sidewalls 120, thereby forming a hooked configuration.

Figure 4:
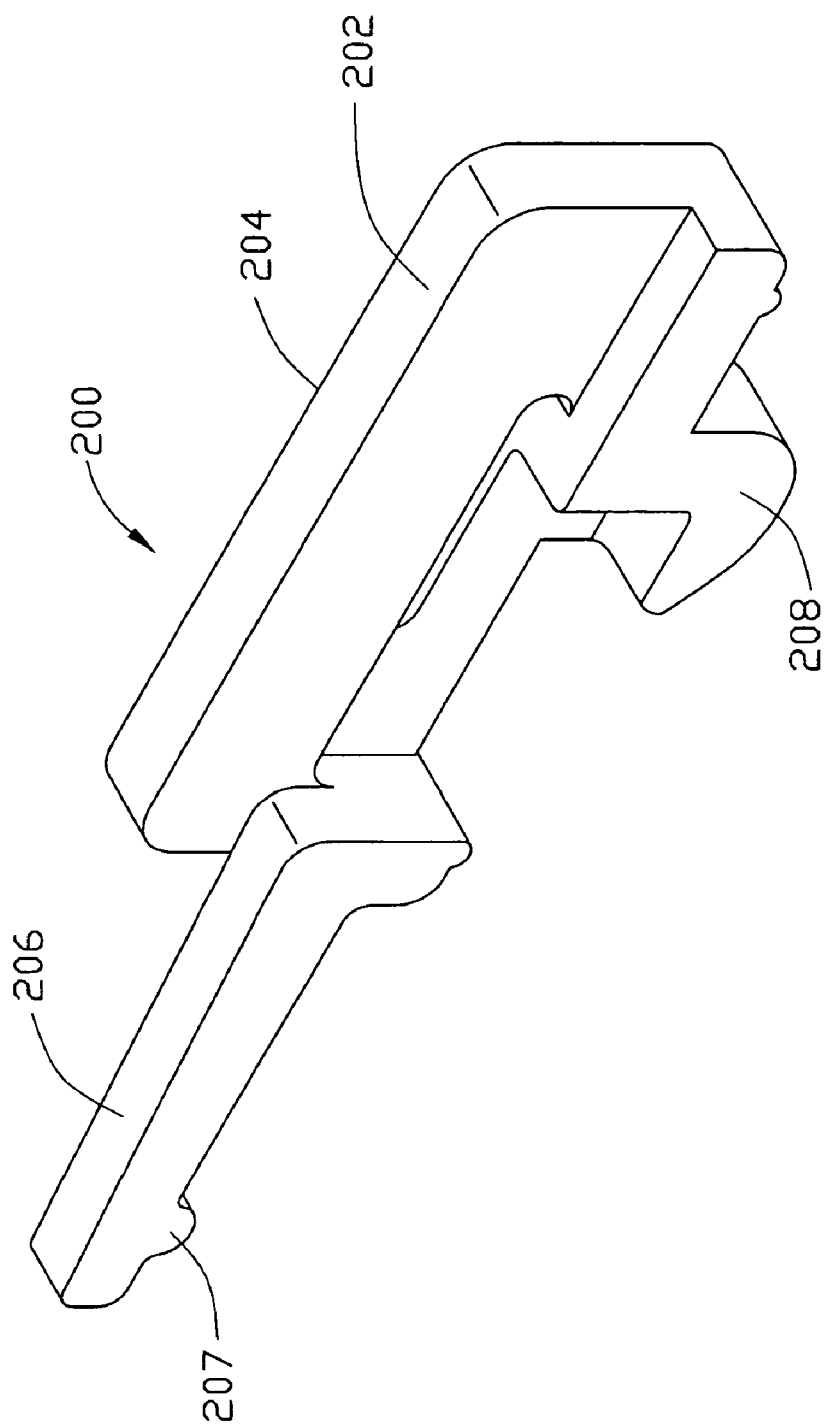
FIG. 4 is an enlarged view of the latch shown in FIG. 1.

Referring also to FIG. 4, the latch 200 includes a rectangular main portion 202. An operation portion 204 is disposed at one side of the main portion 202. An arm portion 206 and an engaging portion 208 are formed together at an opposite side of the main portion 202. The arm portion 206 is opposite to the engaging portion 208. The operation portion 204 is substantially elliptical in shape. The outer surface of the operation portion 204 has a grip portion (unlabelled) to facilitate pushing by a user. The arm portion 206 is basically rod-like in shape. Adjacent to a distal end of the arm portion 206, a projection 207 is formed on the bottom of the arm portion 206. The engaging portion 208 has a hooked configuration formed at a bottom thereof, thereby engaging with the resisting portion 114 of the cover 100.

The housing 300 is a back housing of the mobile phone 101. The housing 300 includes two opposite side boards 310 and two opposite end boards 312, thereby cooperatively defining a rectangular space. A main partition board 320 is disposed at a middle of the housing 300, and separates a first compartment 330 from an opposite second compartment 340. The first compartment 330 is configured for accommodating an electronic device (not shown), such as a printed circuit board. This accommodation is achieved when the housing 300 is assembled with other housings (not shown) of the mobile phone 101. The second compartment 340 is used to engagingly receive the cover 100. The partition board 320 has a rectangular cavity 341 defined in a middle upper portion and adapted for receiving a battery (not shown) therein. Two spaced grips 342 are disposed at the partition board 320 adjacent to each of the side boards 310. Two spaced, symmetrically-opposing cutouts 344 are defined at a bottom end of the partition board 320 of the second compartment 340.

Figure 5:
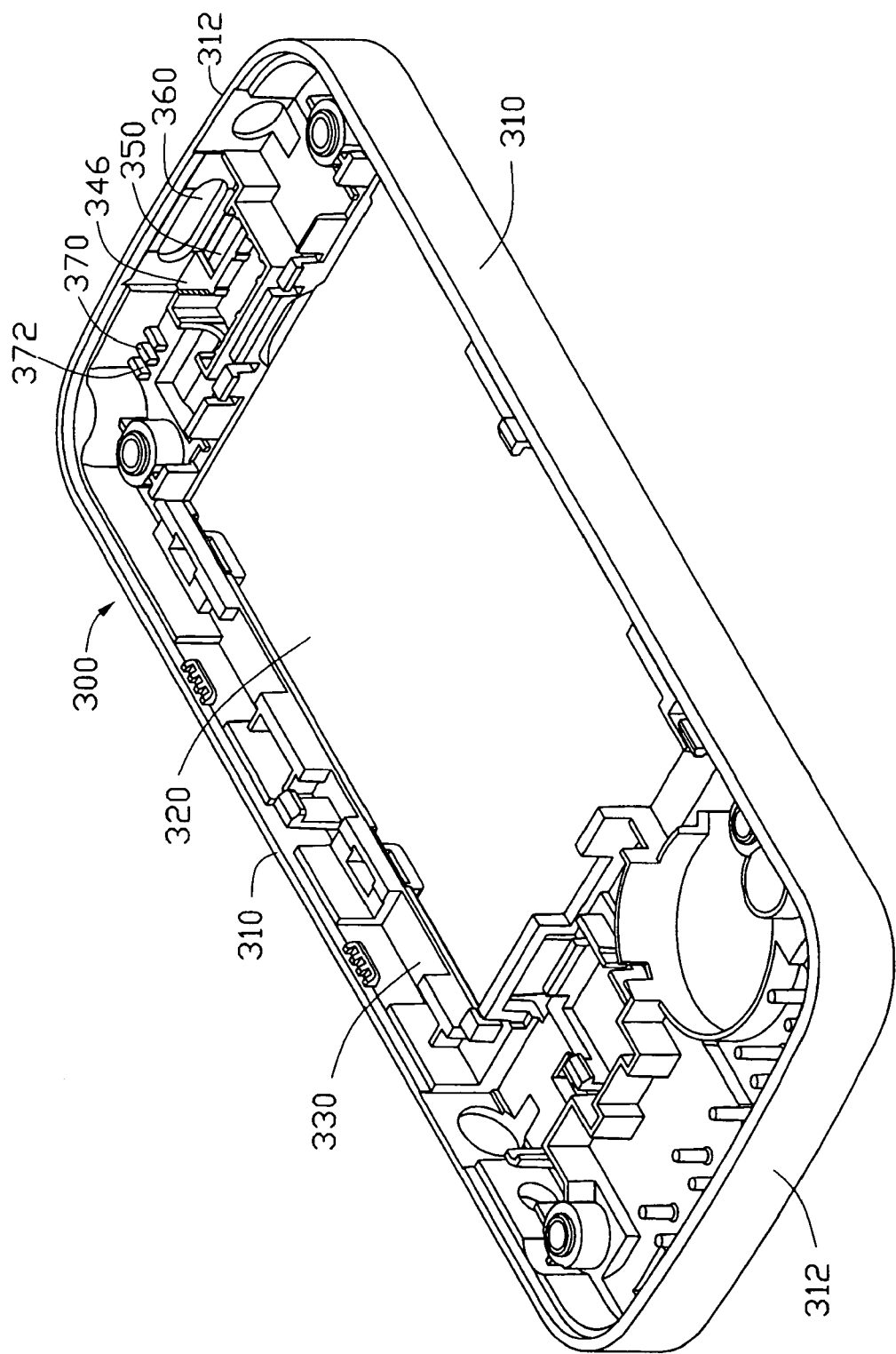
FIG. 5 is an enlarged view of the housing shown in FIG. 1.

Referring also to FIG. 5, opposite to the cutouts 344 at the first compartment 330, a receiving groove 346 is formed in the partition board 320, thereby the latch 200 is received in the receiving groove 346. The bottom of the receiving groove 346 defines a rectangular through hole 350. The through hole 350 is in communication with the partition board 320. One of the end boards 310, adjacent to the receiving groove 346, defines a button hole 360. The button hole 360 communicates with the receiving groove 346. The shape of the button hole 360 corresponds to the operation portion 204 of the latch 200. A sectional area of the operation portion 204 is slightly smaller than that of the button hole 360 of the housing 300, thus the operation portion 204 can be received in the button hole 360 and moves along the button hole 360 at a range. Opposite to the receiving groove 346, three spaced blocks 370 are disposed at the partition board 320 and abut (i.e. adjoins) one of the end boards 312. Two spaced latching groove 372 are formed between the spaced blocks 370, for receiving the projection 207 of the latch 200.

Figure 6:
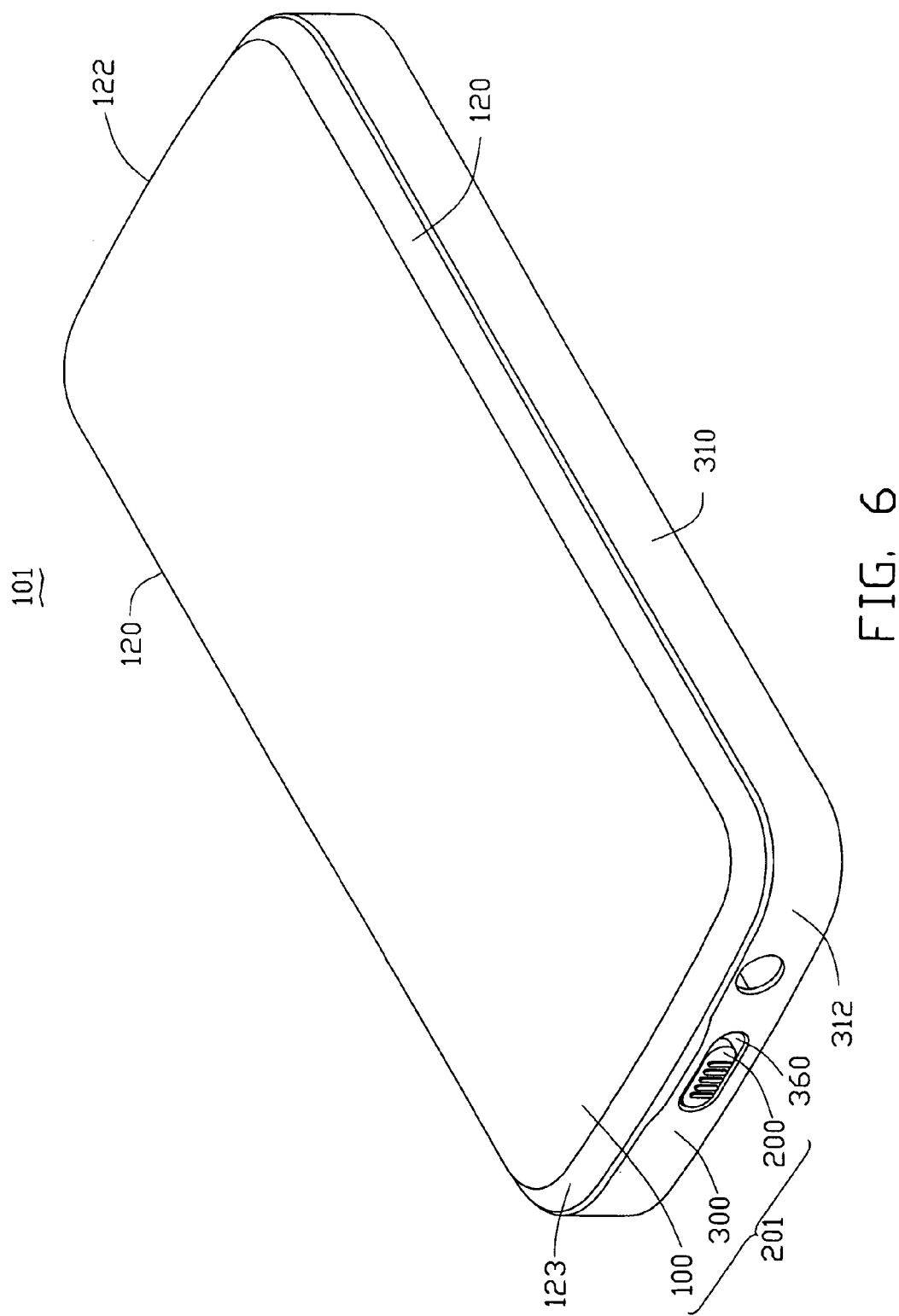
FIG. 6 is an assembled view of the battery cover assembly in FIG. 1, but viewed from another aspect.
Figure 7:
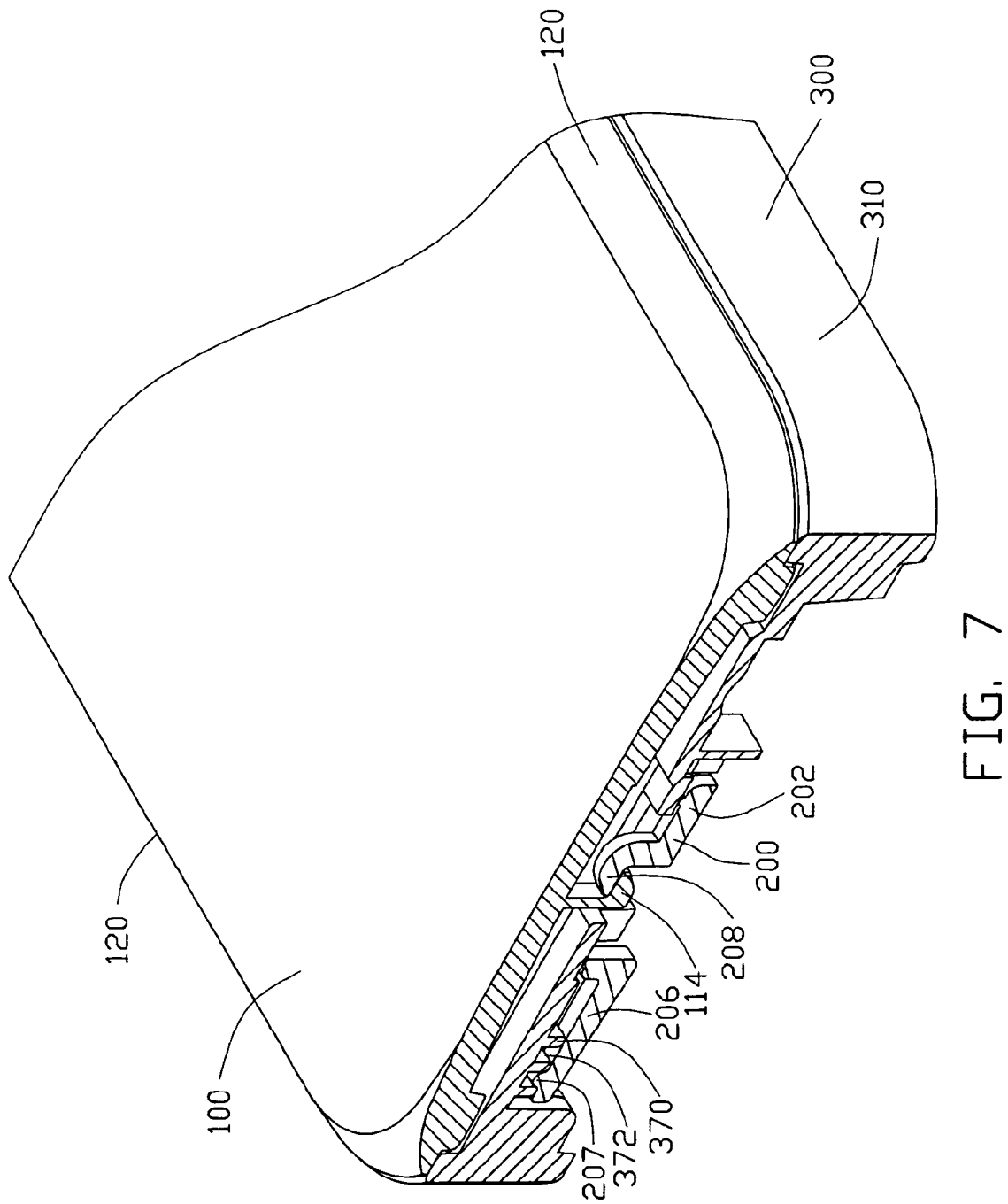
FIG. 7 is an enlarged, partial cut-away view of the battery cover assembly in FIG. 6.

In assembly, referring now to FIGS. 6 and 7, the latch 200 is aligned with the through hole 350 of the housing 300 at the second compartment 340, and the operation portion 204 of the latch 200 faces towards the button hole 360 of the housing 300. The latch 200 is then inserted into the receiving groove 346. Accordingly, the main portion 202 of the latch 200 abuts against the end board 312. At the same time, the engaging portion 208 passes through the through hole 350, and the operation portion 204 is exposed to the outside through the button hole 360 of the housing 300. The projection 207 of the latch 200 engages in a given latching groove 372, thereby mounting the latch 200 into the housing 300.

With the latch 200 mounted on the housing 300, the next step is for the cover 100 to be mounted in the housing 300. First, the inner surface 111 of the cover 100 is directed toward the first compartment 330 of the housing 300. The hooks 113 are inserted into the cutouts 344 of the housing 300. At the same time, the clasps 112 of the cover 20 are positioned relative to the grips 342 of the housing 300, the resisting portion 114 is directed toward the through hole 350 of the housing 300. Next, the cover 100 is pressed onto the housing 300 using the end wall 122 adjacent to the hooks 113 as a rotational axis. The clasps 112 are locked into the grips 342. The resisting portion 114 is received in the through hole 350 of the housing 300. The latch 200 is pushed so as to make the engaging portion 208 engage with the resisting portion 114 of the cover 100. At the same time, the projection 207 of the latch 200 engages in the next latching groove 372 of the housing 300. Accordingly, the cover 100 is thus removably attached to the housing 300.

When the cover 100 is detached from the housing 300, the operation portion 204 of the latch 200 is pushed down by a user's finger. The projection 207 of the latch 200 falls out from the latching groove 372. At the same time, the engaging portion 208 is caused to slide relative to the cover 100. Furthermore, the engaging portion 208 falls out from the resisting portion 114 of the cover 100. As a result, the clasps 112 disengaged with the grips 342 of the housing 300, thus the cover is detached from the housing 300.

In alternative embodiments, the engagement between the hooked configuration of the resisting portion and the engaging portion of the latch act as a locking structure to releasably lock the cover to the housing. Furthermore, the locking structure may be replaced with other structure such as magnetic structure so as to attract the engaging portion of the latch by magnetic force. In the above-mentioned embodiments, the three blocks 370 disclosed above may be replaced with other positioning portion. Moreover, the engagement between the three blocks and the projection disclosed above may be replaced with other limiting structures such as toothed structure so as to selectably engage in one of the positioning portions of the housing. In the above-mentioned embodiment, the latch is slidable between a locked position where the locking structure locks the cover in a locked state and an unlocked position where the locking structure release the cover so as to detach the cover.

As described above, the preferred embodiment provides a battery cover assembly for portable electronic devices, such as mobile phones. When the button is pushed, the cover of the battery cover assembly can be easily removed. This pushbutton removal step makes the operation of the device more user-friendly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A portable electronic device comprising:
   a housing including a positioning portion, the positioning portion including three spaced blocks, the blocks being arranged in line, two latching grooves being formed among the blocks;
   a latch being movable relative to the housing along a moving axis, the latch having an arm portion at one end along the moving axis, and an engaging portion at the other opposite end along the moving axis, a projection being disposed at a bottom of the arm portion, the projection selectably engaging in the latching grooves;
   a battery cover having a resisting portion;
   wherein, the resisting portion of the cover is lockable with the engaging portion for locking the battery cover to the housing by moving the latch in a first direction, and is unlockable from the engaging portion for releasing the battery cover by moving the latch in a second direction opposite to the first direction, the arm portion engages with the positioning portion so as to stop the latch from releasing the cover.

2. The portable electronic device as claimed in claim 1, wherein the housing including a main partition board and an end board, the blocks protrude from the main partition board and abut the end board.

3. The portable electronic device as claimed in claim 2, wherein the latch further comprises an operating portion, and the end board defines a button hole allowing the operating portion to slide along.

4. The portable electronic device as claimed in claim 3, wherein the arm portion and the engaging portion are positioned at two opposite sides of the operating portion.

5. The portable electronic device as claimed in claim 4, wherein the arm portion is rod-like in shape, the engaging portion has a hooked configuration, and the arm position and the engaging portion extend in a same direction and have a space therebetween.

6. The portable electronic device as claimed in claim 5, wherein the main partition board defines a through hole allowing the hooked configuration to slide along the cover, and the cover includes a resisting portion received in the through hole to engage with the hooked configuration.

7. A portable electronic device comprising:
a housing having a positioning portion, a button hole and a through hole;
a latch attached to the housing inside and partially disclosed via the button hole, the latch being movable relative to the housing along a moving axis, the latch having an arm portion at one end along the moving axis, and an engaging portion at the other opposite end along the moving axis, the arm portion and the engaging portion being spaced to define a space therebetween, the engaging portion including a hooked configuration, the hooked configuration slidablly received in the through hole;
a battery cover detachably attached to the housing, the battery cover having a resisting portion positioned between the arm portion and the engaging portion, the resisting portion received in the through hole to engage with the hooked configuration;
wherein, the resisting portion of the cover is lockable with the hooked configuration for locking the battery cover to the housing by moving the latch in a first direction, and is unlockable from the hooked configuration for releasing the battery cover by moving the latch in a second direction opposite to the first direction, the arm portion engages with the positioning portion so as to stop the latch from releasing the cover.

8. The portable electronic device as claimed in claim 7, wherein the housing includes a main partition board, the through hole is defined in the main partition board, and the positioning portion is formed on the main partition board adjacent to the through hole.

9. The portable electronic device as claimed in claim 7, wherein the arm portion is rod-like in shape.

10. The portable electronic device as claimed in claim 7, wherein the positioning portion includes three spaced blocks arranged in line, two latching grooves are formed among the blocks, a projection is formed on the arm portion, and the projection is selectively engaged in the latching grooves.

11. The portable electronic device as claimed in claim 10, wherein the housing including a main partition board and an end board, the blocks protrude from the main partition board and abut the end board.

* * * * *